United States Patent
Auge et al.

(10) Patent No.: US 10,355,551 B2
(45) Date of Patent: Jul. 16, 2019

(54) SUPPORT ELEMENT AND STATOR ASSEMBLY COMPRISING THE SAME

(71) Applicant: General Electric Technology GmbH, Baden (CH)

(72) Inventors: Christian Auge, Mannheim (DE); Stefan Handt, Carlsberg (DE)

(73) Assignee: General Electric Company, Schenectady, NY (US)

( * ) Notice: Subject to any disclaimer, the term of this patent is extended or adjusted under 35 U.S.C. 154(b) by 257 days.

(21) Appl. No.: 15/214,864

(22) Filed: Jul. 20, 2016

(65) Prior Publication Data

US 2016/0365766 A1    Dec. 15, 2016

Related U.S. Application Data

(63) Continuation of application No. PCT/EP2014/073792, filed on Nov. 5, 2014.

(30) Foreign Application Priority Data

Jan. 23, 2014  (EP) .................................. 14152324

(51) Int. Cl.
*H02K 3/50* (2006.01)
*H02K 5/24* (2006.01)

(52) U.S. Cl.
CPC .............. *H02K 3/50* (2013.01); *H02K 3/505* (2013.01); *H02K 5/24* (2013.01); *H02K 2203/09* (2013.01)

(58) Field of Classification Search
CPC .................................. H02K 3/50; H02K 3/505
USPC ............................................ 310/71, 91, 260
See application file for complete search history.

(56) References Cited

U.S. PATENT DOCUMENTS

| | | | | | |
|---|---|---|---|---|---|
| 1,329,242 | A | * | 1/1920 | Hellmund | H02K 3/505 310/260 |
| 3,089,048 | A | * | 5/1963 | Bahn | H02K 3/505 310/231 |
| 5,051,642 | A | * | 9/1991 | Hediger | H02K 3/505 310/260 |
| 5,214,324 | A | * | 5/1993 | Holmes | H02K 3/24 310/260 |
| 6,198,193 | B1 | * | 3/2001 | Kappauf | H02K 3/505 29/596 |
| 7,119,462 | B2 | | 10/2006 | Zhang et al. | |

(Continued)

FOREIGN PATENT DOCUMENTS

| | | |
|---|---|---|
| CN | 1103738 A | 6/1995 |
| CN | 103354872 A | 10/2013 |

(Continued)

OTHER PUBLICATIONS

First Office Action and Search issued in connection with corresponding CN Application No. 201480073912.X dated Jan. 8, 2018.

*Primary Examiner* — Quyen P Leung
*Assistant Examiner* — Eric Johnson
(74) *Attorney, Agent, or Firm* — Frank A. Landgraff (57) ABSTRACT

The present disclosure relates to a stator assembly for an electrical machine, and more in particular relates to a support element utilized within the stator assembly in order to improve its performance. The support element allows the thermal expansion of round connection arms while detuning the Eigen-frequency and reducing the amplitude of the vibrations.

10 Claims, 6 Drawing Sheets

(56) References Cited

U.S. PATENT DOCUMENTS

2012/0091853 A1    4/2012  Dorsey
2012/0126649 A1*   5/2012  Kn .......................... H02K 3/505
                                                    310/91

FOREIGN PATENT DOCUMENTS

DE        44 21 269  C1    10/1995
GB           1289826  A  *  9/1972  ............. H02K 3/505
GB         2 485 663  A     5/2012

* cited by examiner

FIG. 8

SUPPORT ELEMENT AND STATOR ASSEMBLY COMPRISING THE SAME

CROSS-REFERENCE TO RELATED APPLICATIONS

This application claims priority to PCT/EP2014/073792 filed Nov. 5, 2014, which claims priority to European Patent Application No. 14152324.1 filed on Jan. 23, 2014, both of which are hereby incorporated in their entirety.

TECHNICAL FIELD

The present disclosure relates to a stator assembly for an electrical machine, and more in particular relates to a support element utilized within the stator assembly in order to improve its performance.

BACKGROUND

State-of-the-art electric energy conversion relies on a three-phase power is network with alternating currents (AC) at 50 Hz or 60 Hz frequency and voltage levels ranging from several hundreds of Volts to hundreds of thousands of Volts. The conversion of rotating mechanical energy into electric energy and vice versa is done by generators and by motors, respectively. Those rotating machines can be divided into asynchronous and synchronous apparatuses.

Motors and generators comprise a stator and a rotor. The rotor of the machine rotates inside the stator bore of the stator. Rotating machines generate the magnetic field typically through rotor pole windings. The number of rotor poles and the frequency of the stator magnetic field define the number of revolutions per minutes (rpm) of the rotating machine.

As known, the stator-bars of generators are generally made of a top and a bottom layer. The bars of top and bottoms layer are connected to each other by copper pieces called lugs, such to form electrical coils. An electrical connection is then needed between the electrical coils and the terminals of the generator, which lead the power to the outside through the generator casing. For this purpose, this connection is established by copper bars (of rectangular or round cross-sections) bent around the support structure on its outermost diameter.

Generally, the first and the last bar of a coil of the winding are connected to the terminals. These bars (usually six per layer, equally distributed over the circumference) are called phase bars and are specially designed to lead the generated electrical power of the generator into an external grid. The connection between the phase bars and the terminals, which lead the power through the generator's casing and are called round connections or phase rings.
They are electrically insulated against each other, and quite sophisticated shapes are required for reaching the phase bars and connecting them to the generator terminals whilst maintaining the required insulation distances.

The round connections are generally fixed to the support structure to prevent high vibrations.

The end winding support structure of the generator is located at the front of the press plates and the outer side of the end winding of the stator bars. This support structure is used for the fixation of the stator bars ends, to apply mechanical strength to the end winding and withstand the forces occurring during normal operation and accidental incidents. The support usually consists of brackets mounted in axial direction and often of supporting rings to stiffen the structure.

The ends of the round connections, which are foreseen to be connected to the phase bars, sometimes cannot be fixed to the supporting structure over a long distance, since the position of the phase bars might be located between the supporting brackets.

As a result of this, round connection ends have a high risk of vibrations.

As a consequence, an important problem is the vibration of round connection arms to the phase lugs. The Eigen frequency of these arms often need to be detuned (e.g. no resonance between 100 and 140 Hz for 60 Hz applications) or at least the vibration levels have to be reduced to a minimum.

Cracks in the strands close to the phase lugs and in the lugs can be found in several generators. These cracks are mostly caused by high vibration levels of the round connections arms. Some round connections arms have Eigen frequencies close to 120 Hz (for 60 Hz applications) or 100 Hz (for 50 Hz applications).

Up to date, some existing solutions suggest applying a very stiff support between the round connection arm and the support ring with cords or tape together with resin. This solution detunes the Eigen-frequency out of the range of 100 to 140 Hz very well and reduces the amplitude of the vibrations.

On the other hand thermal expansion, which does occur during operation of the machine, should not be blocked. Such thermal expansion mainly occurs along the axial direction (usually causing a displacement of the connection arm of about 2-3 mm), but also in radial and tangential directions. Therefore a "stiff" solution is not possible.

The stiff solution hinders the thermal expansion, which increases the stress at the strands close to the lug and considerably increases the danger of cracks in the strand. On the other hand, the high stress to the cords/tapes of the stiff support may lead to a loosening of the connection over time, which renders this support useless for reducing the vibrations.

Generally, the stiff support according to the teachings of the prior art entails a high risk of breakage caused by the blocking of the thermal expansion. The present disclosure is oriented towards providing the aforementioned needs and towards overcoming the aforementioned difficulties.

SUMMARY

According to preferred embodiments, the object of the present invention is to provide a support element as substantially defined in independent claim 10, placed between the support structure and the connection arm.
The support element, as it will be described in details with reference to preferred but not limiting embodiments, allows the thermal expansion while detuning the Eigen-frequency in the arms and reducing the amplitude of the vibrations.

Said differently, the support element is such to allow axial, radial and tangential displacement of the round connection arm due to thermal expansion whilst hindering vibrations.

Further object of the present invention is to provide a stator assembly, as substantially defined in claim 1, which comprises the support element. As it will be appreciated, the stator assembly might comprise a number of support elements disposed along its circumferential development as required by the particular configuration of the machine, in order to ensure the correct functioning of the connection arms and allow the thermal expansion thereof.

Preferably, the support element shall be made from glass fibre reinforced insulation material with a lamination direction along the contour.

According to an aspect of the invention, the upper vertical part comprises screw-type connection means to the support ring. Advantageously, the upper vertical part is thicker than the lower vertical part in order to allow movement caused by vibration between the lower part of the support element and the annular ring.

Differently, the horizontal part of the support element is glued with resin to the lower side of the round connection arm. Additionally, it also may be fixed by cords or tapes around the connection arm and the support element to ensure a very stiff contact therebetween.

The proposed solution was developed after extensive studies of the winding head and round connection vibration behaviour. The invention reduces the vibration amplitudes and therefore the stresses due to vibrations in the affected parts considerably. It is easy to install and comparatively cost efficient.

BRIEF DESCRIPTION OF DRAWINGS

The foregoing objects and many of the attendant advantages of, this invention will become more readily appreciated as the same becomes better understood by reference to the following detailed description when taken in conjunction with the accompanying drawings, wherein.

DETAILED DESCRIPTION

Figure 1:
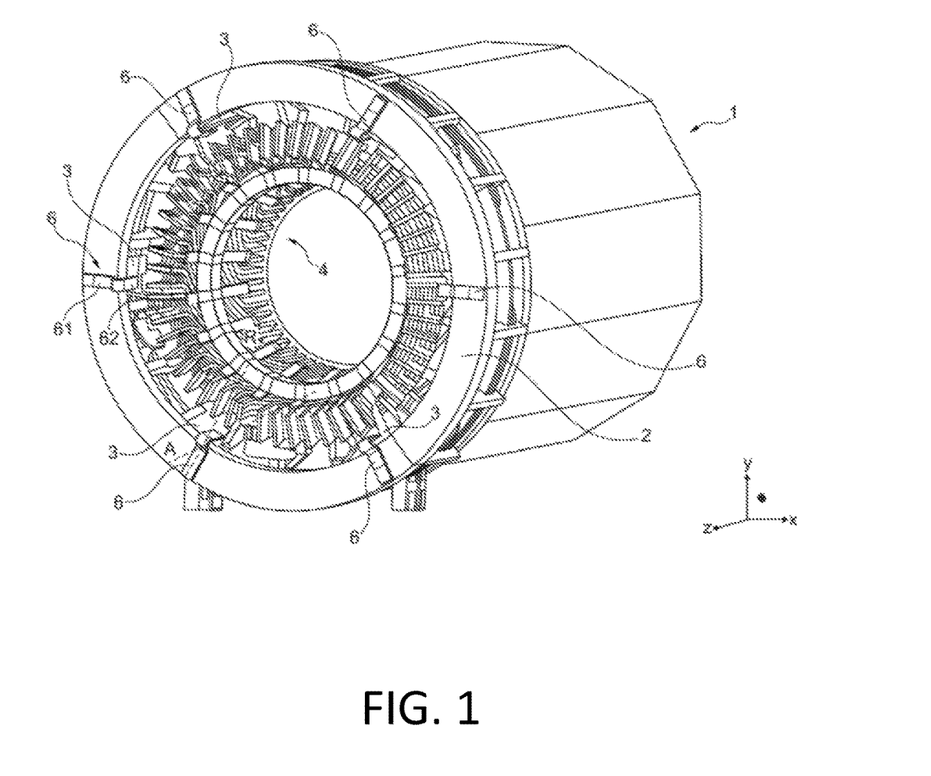
FIG. 1 is a perspective view of a stator assembly according to the present invention.

With reference to FIG. 1, a perspective view of a stator assembly is shown, generally indicated with the reference number 1. The stator assembly 1, part of an electrical machine (not shown) comprises internally a plurality of stator winding bars 4 in which voltage is induced. These bars cooperate together with the rotor (not shown) in the process of energy conversion. In particular, the
generated power is made available on external terminals (not shown), which are then connected to a grid to feed. The connection established between the stator winding bars 4 and the external terminals is operated by specially designed connection bars, generally referred to as "round connection", of which an arm 3 is indicated in the figure.

The stator assembly 1 may comprise a plurality of connection arms 3, disposed along its circumferential development, in a number generally depending on the particular type of the generator used. In the example here described, the stator assembly 1 comprises six connection arms for each top and bottom layer of the stator bars equally spaced from each other, so twelve arms in total. Six arms each for top and bottom layer are a typical arrangement for three-phase generators with two parallel circuits.

The stator assembly further comprises a support structure, which in turn comprises an annular ring 2. The arrangement of the stator assembly 1 is well known to those skilled in the art, and therefore it won't be disclosed with further details.

As mentioned above, connection arms 3 are often subjected to high vibrations. In order to hinder the high vibrations, the stator assembly according to the invention comprises a support element 6, positioned between the support structure 2 and the connection arm 3.

As explained, the figure shows several connection arms 3 each one linked to the support structure 2 by a respective support element 6. It will be appreciated that what will be hereafter described about a single connection arm 3 and the respective supporting element 6 will stand for every connection arm and support element of the stator assembly.

The support structure is generally made of an electrical insulating material to avoid unwanted damaging current flows. For the same reasons, the support element 6 is made of an electrically insulating material as well. Preferably, the support element 6 is made of a reinforced glass fibre.

Advantageously, the support element 6 comprises a resilient module configured to allow displacements of the connection arm due to its thermal expansion because of high temperatures, which occur during operation, whilst hindering high vibrations.

According to a preferred embodiment, the support element 6 comprises a radial member 61 disposed along axial direction A of the electrical machine and an axial member 62 in turn disposed along a radial direction R.

The axial member 62 of the support element 6 is connected to the connection arm 3, while the radial member 61 is connected to the annular ring 2.

Figure 2:
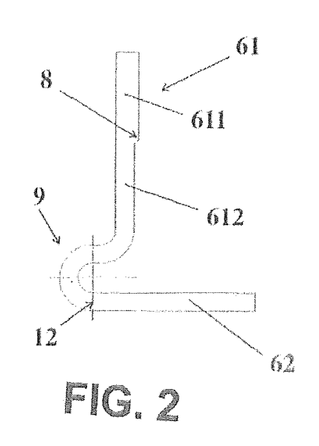
FIG. 2 is a side view of a support element according to the present invention.
Figure 3:
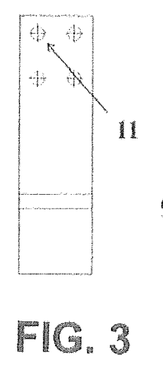
FIG. 3 is a front view of a support element according to the present invention.
Figure 4:
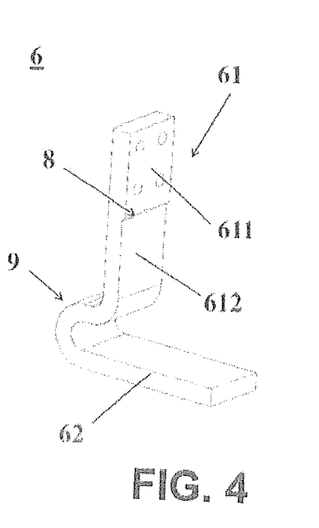
FIG. 4 is a perspective view of a support element according to the present invention.
Figure 5:
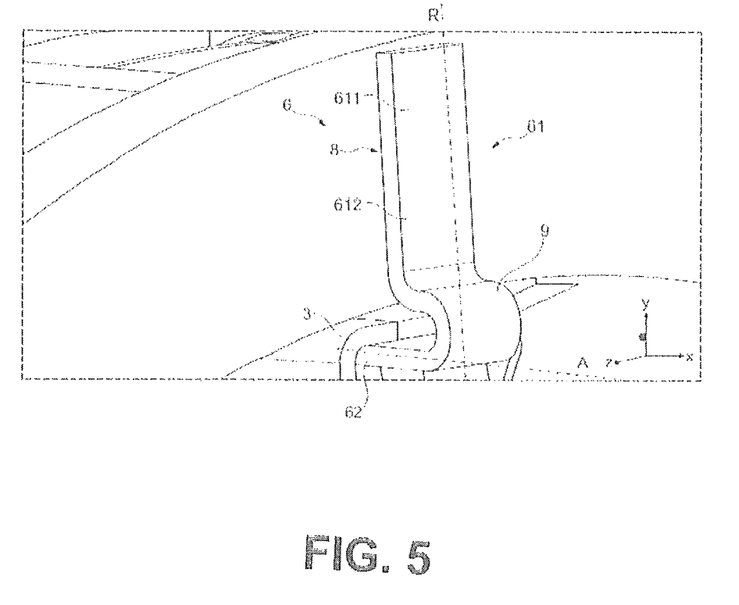
FIG. 5 is a side perspective view of a support element mounted on a stator assembly.
Figure 6:
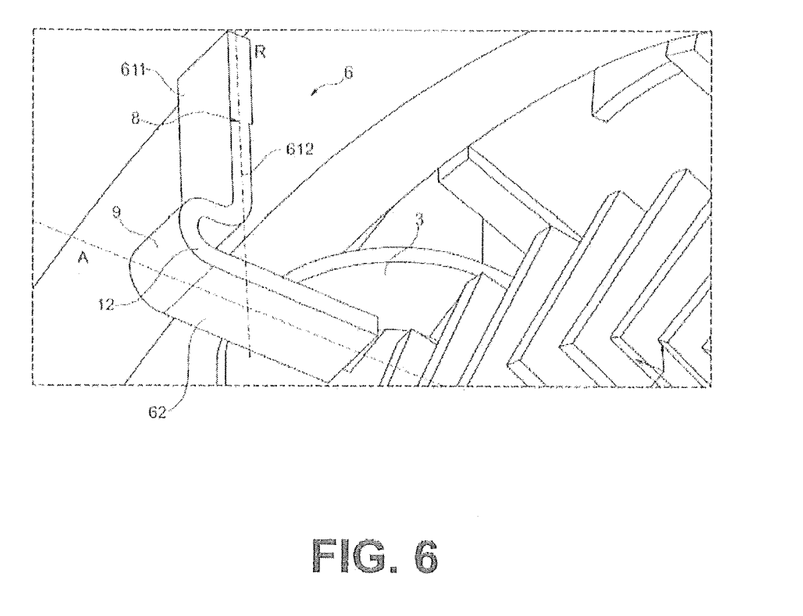
FIG. 6 is a bottom perspective view of a support element mounted on a stator assembly.

Making now reference to FIGS. 2, 3 and 4, it is shown the support element 6, object of the present invention, in three different views. In particular, FIGS. 2, 3 and 4 show the support element 6 respectively in lateral, front and perspective views.

As clearly shown in the figures, the support element 6 is substantially L-shaped and comprises the radial member 61 and the axial member 62, disposed along respectively radial and axial directions of the electrical machine when mounted on the stator assembly (as shown in preceding FIG. 1).

More in particular, the radial member 61 comprises a first portion 611 and a second portion 612, the latter being interposed between the axial member 62 and the first portion 611. When mounted on stator assembly, the first portion 611 is connected to the annular ring (not shown) whilst the second portion 612 is released from it such that the support element 6 has a resilient reaction in response to a rotation of second member 612 about a linear pivot region 8.

The linear region 8 delimits the first portion 611 (connected to the annular ring by means of a screw-type connection 11 indicated in FIG. 3) from the second region 612 which is released from the same.

Advantageously, the second portion 612 has a thickness which is smaller than that of the first portion 611 such to define a step in correspondence of the linear region 8, so that second portion 612 has its inner surface that, when mounted on the stator assembly and facing the annular ring, is not in direct contact with it. This way, friction between the two parts caused by vibration is avoided. Preferably, the, step has a rounded edge so that three-axial tension states, which could arise during resilient displacements of second portion 612, are avoided.

Moreover, the support member 6 comprises a U-shaped junction 9, interposed between the axial member 62 and the radial member 61. The U-shaped junction 9 offers an additional pivot region which allows the support element to resiliently react to a displacement of the axial member 62 around a region 12, which is substantially located where a curvature of the junction merges with the axial member 62.

With now reference to following FIGS. 5-8, it is shown two different views of the support element 6 mounted on the stator assembly. In particular, it is readily understood that the second member 612, acting as a resilient module as the first member 611 is attached to the annular ring 2 while the second member is released from it, provides for a resilient reaction to an expansion of the connection arm 3 along the axial direction A, as the connection arm is connected to the axial member 62 and thus forces the second portion 612 of the radial member 61 to rotate about a linear region 8, as previously explained. Similarly, the U-shaped junction 9 acts as a further resilient module as it provides a resilient reaction of the support element 6 caused by the expansion of the connection arm 3 along a radial direction R. In particular, the axial member 62 can resiliently rotate around a linear region 12 this way allowing a thermal expansion of the connection arm 3 in turn connected to the axial member 62. Preferably, the connection arm 3 is glued to the axial member 62 with a resin or fixed with tapes or cords.

Figure 7:
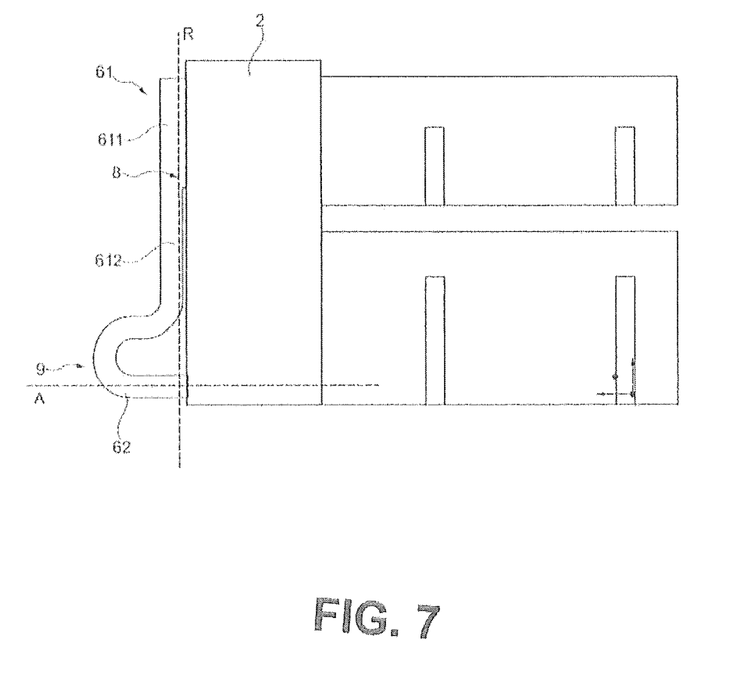
FIG. 7 is a side view of a support element mounted on a stator assembly.

With particular reference to FIG. 7, it is well visible that second portion 612 of radial member 61 has a thickness which is smaller than the first portion 611. So there is no contact between second portion 612 and the support structure, thus avoiding friction which would be caused by high vibrations.

Figure 8:
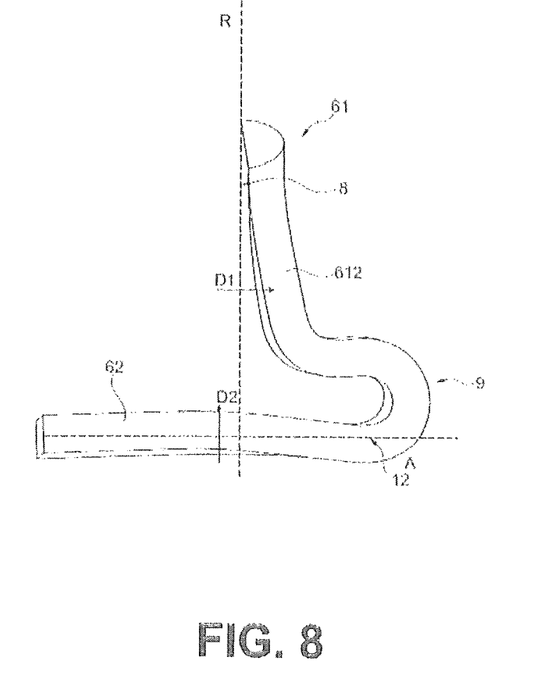
FIG. 8 shows a side view of an example of how the support element can deform in order to allow thermal expansion of the round connection arm in exaggerated scale in order to show the effect.

With reference to last FIG. 8, it is shown the support element 6 in operation in a deformed state. In particular, it is shown a possible displacement of the second portion 612 indicated by arrow D1 caused by the expansion of the connection arm (not shown) which forces the axial member 62 to move along the axial direction A and consequently forces the second portion 612 to rotate about a linear region 8 of radial member 61. The resilient reaction of second member 612, which is released from the support structure, allows such thermal expansion without leading to breakage of the support element.

In a similar way, it is shown a possible displacement of the axial member 62 indicated by arrow D2 caused by the expansion of the connection arm, end-winding and stator bars (not shown) which forces the axial member 62 to move along the radial direction R and consequently the axial member 62 to rotate about a linear region 12 which is located where the U-shaped junction 9 merges with the axial member 62. The resilient reaction of the U-shaped junction allows the thermal expansion of the connection arm along the radial direction without leading to breakage of the support element.

It will be appreciated that thermal expansions can generally derive from the heating up of stator components.

While the stator bars in the active part can expand mainly in axial direction, for the end-winding part expansions along radial and tangential directions can occur as well.

Therefore, the thermal expansion experienced by the connection art can also be caused typically by the bars of the stator assembly.

Also given by the arrangement of the bars in the end-winding, there may be a tangential force due to thermal expansion (not shown). The resilient reaction of the U-shaped junction allows the thermal expansion of the connection arm along the tangential direction without leading to breakage of the support element.

Although the present invention has been fully described in connection with a preferred embodiment, it is evident that modifications may be introduced within the scope thereof, not considering the application to be limited by these embodiments, but by the content of the following claims.

The invention claimed is:

1. A stator assembly for an electrical machine, comprising:
   a support structure;
   a connection arm for connecting one or more stator winding bars to external terminals; and
   a support element, placed between said support structure and said connection arm, the support element comprising
   a radial member disposed along a radial direction of the electrical machine and connected to said support structure,
   an axial member connected to said connection arm and disposed along an axial direction of the electrical machine, and
   a U-shaped junction interposed between the axial member and the radial member with a first end of the U-shaped junction joining a resilient module, a second end of the U-shaped junction joining the axial member, and the second end of the U-shaped junction distanced from the support structure to allow thermal expansion of the connection arm along the radial direction.

2. The stator assembly according to claim 1, wherein the radial member comprises a first portion connected to said support structure and a second portion, being the resilient module, interposed between said first portion and said axial member, the second portion not in direct contact with the support structure to allow the thermal expansion of the connection arm along the axial direction.

3. The stator assembly according to claim 2, wherein said second portion has a smaller thickness than that of said first portion defining a step therebetween.

4. The stator assembly according to claim 1, wherein said support element and/or said support structure are made of an electrical insulating material.

5. The stator assembly according to claim 1, wherein said support element is made of reinforced glass fibre.

6. The stator assembly according to claim 1, wherein said support element is glued to said connection arm.

7. The stator assembly according to claim 1, wherein said support element is connected to the support structure by a screw-type connection.

8. The stator assembly according to claim 1, wherein said support structure is an annular support ring.

9. A support element for a stator assembly of an electrical machine, comprising:
   the support element arranged between a connection arm and a support structure of the stator assembly, with the support element comprising
   a radial member connected to the support structure,
   an axial member connected to the connection arm, the radial member and axial member disposed respectively along a radial direction and an axial direction of the electrical machine when mounted on the stator assembly, and a U-shaped junction interposed between the radial member and the axial member with a first end of the U-shaped junction joining a resilient module, a second end of the U-shaped junction joining the axial member, and the second end of the U-shaped junction distanced from the support structure; and the connection arm connecting one or more stator winding bars to external terminals.

10. The support element according to claim 9, wherein the radial member comprises a first portion and a second portion, the second portion, being the resilient module, interposed between said first portion and said axial member, with the second portion having a smaller thickness than that of said first portion defining a step therebetween.

* * * * *